Patented July 27, 1954

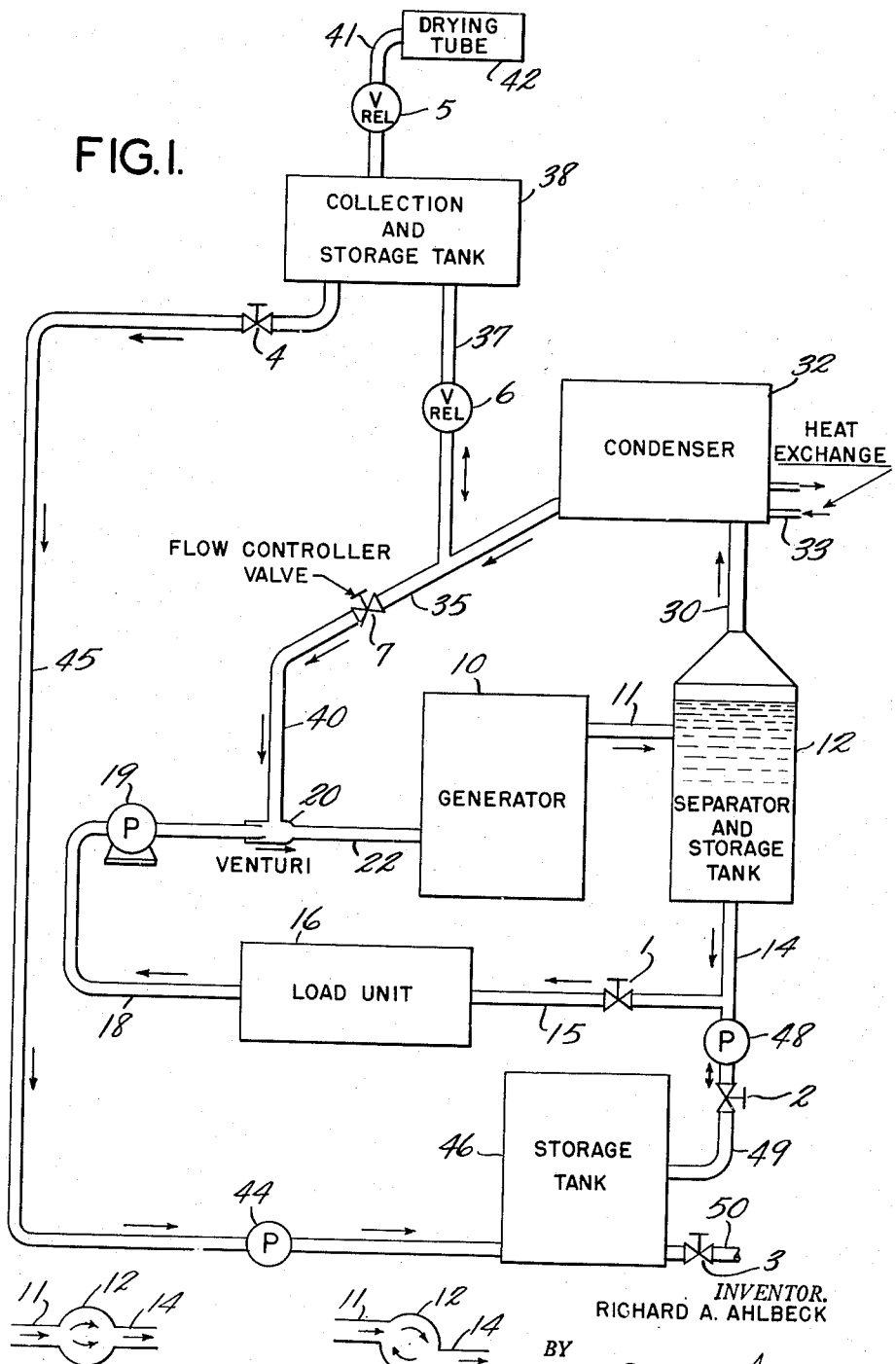

2,684,812

UNITED STATES PATENT OFFICE 2,684,812

THERMAL DECOMPOSITION RETARDATION SYSTEM

Richard A. Ahlbeck, Somerville, N. J., assignor to John B. Pierce Foundation, New York, N. Y., a corporation of New York Application April 25, 1952, Serial No. 284,472

Claims priority, application Great Britain April 27, 1951

2 Claims. (Cl. 237—63)

This invention relates to a system and process of utilizing heat energy through the use of a circulating liquid, and more particularly to heat transfer systems employing a circulating liquid subject to decomposition and to a process of applying heat by indirectly contacting material to be heated with a heat transfer liquid.

Certain types of heat transfer systems are designed to convey heat to a surface to be heated through circulation of liquid at an elevated temperature. The liquid necessarily has a high boiling point which is substantially above the operating temperature. Such a system normally comprises a generator or boiler for heating the liquid, a load unit containing the material to be heated, means for circulating the liquid through the system, such as a pump, and a storage or expansion tank for receiving liquid as a result of expansion of the liquid during heating.

Such a simple system gives no difficulties, provided the heat transfer liquid is stable and remains in the liquid state throughout the system. If the static head pressure is above the sum of the partial pressures of all the components of the liquid, the heat transfer medium remains in the liquid phase. The use of such a system employing a heat transfer medium in the liquid phase is to be distinguished from a system in which the heat transfer medium is vaporized and the vapor used for heating.

If the temperature of the liquid is close to the boiling point of any component, it may not be possible to maintain a pressure necessary to prevent vaporization of at least a portion of the liquid. When the temperature level approaches the boiling point of the multi-component liquid at the system pressure there is always the danger of vapor formation which vapor will be rich in the more volatile components. In addition such liquids often tend to break down due to cracking, dissociation or other types of reaction when maintained at high temperatures over long periods of time, so as to liberate components of lower boiling point.

When vapor formation occurs for any reason, vapor lock in the system may result. If vapor binding occurs in the pump (pump inlet pressure is usually the lowest pressure in the system), there is a resultant failure of circulation of the liquid. After circulation ceases, decomposition of the liquid at certain points due to local overheating is accelerated, with formation of more vapor and often with the formation of resins or other solids which are precipitated in the lines.

When the difficulties described above are caused by a decomposition of the liquid, the formation of lower boiling components may be the result of a substantially irreversible reaction. In such cases the low boiling components serve no function in the system and their presence is undesirable for the reasons explained heretofore. The cracking of hydrocarbon oils is typical of this type of reaction.

The formation of lower boiling components may, however, be the result of dissociation or a reaction that is reversible at least to some extent. In such cases it is desirable to maintain the lower boiling components in contact with the liquid to repress the dissociation and to permit the reassociation of the components under conditions where this is favorable. Tetra-aryl silicates, for example, upon prolonged heating at a high temperature, liberate phenols which boil below the temperature at which a system using tetraphenyl silicate would ordinarily be operated. This tendency to dissociate is greatest, of course, at those points where the liquid is most highly heated. If the liquid is kept in contact with the phenol, the dissociation to liberate the phenol may be repressed to some extent and the phenol may reassociate with the liquid at least in part, under conditions favorable for such reassociation, such as when the liquid is cooled. Thus it is desirable to have a substantial amount of dissociated components present at all times in the liquid throughout the system and the highest concentration of dissociated components present when the liquid is most highly heated. Some decomposition may also take place which represents reactions which are not reversible, such as the formation of hydrocarbons. Although these components cannot reassociate to form the original medium, they provide a partial pressure which may likewise repress dissociation. Consequently, by the judicious selection of a liquid in relation to the temperature of operation, irreversible dissociation or decomposition reactions may be minimized if any material liberated is kept in contact with the liquid in the system.

The problem is aggravated if the tetra-aryl silicate is or contains tetracresyl silicate. Use of such compositions has been suggested because of their high boiling points and low freezing points. Mixtures containing 20% tetracresyl orthosilicate and 80% tetraphenyl orthosilicate have been recommended in the patent literature. Experience has shown that such a mixture does not have a sufficiently low freezing point and consequently most commercial mixtures contain approximately 40% tetracresyl orthosilicate and 60% tetraphenyl orthosilicate.

It has been found that when pure tetracresyl orthosilicate or mixtures thereof with tetraphenyl orthosilicates are subjected to high temperature, say of the order of 700° F., over a period of several months, even in a closed system wherefrom neither liquid nor vapor can escape nor air, moisture or impurities enter, substantial amounts of lower boiling products are formed. These products are largely low-boiling substances and include phenol, cresol, which may reassociate under suitable conditions, and benzene, toluene, xylenes and other hydrocarbons which are not thought to reassociate. While a system employing such a liquid initially may operate for a time at the desired high temperature, it may be necessary during operation over a period of months gradually to reduce the operating temperature to prevent vapor lock due to the liberation of vapors at higher temperatures.

Accordingly, it is an object of the present invention to provide a process of separating gaseous low-boiling components from heat transfer liquids in normal use and to provide a heat transfer system including means for separating gas from said liquid in the normal course of circulation thereof through the system.

It is a further object of the invention to provide a heat transfer system of the type described including a means of separating gaseous low-boiling components situated at the point of greatest dissociation, means for condensing and storing said gaseous components and a means of returning at least a part of the condensed components to the circulating heat transfer liquid system just prior to its being heated to the operating temperature.

It is a further object of the invention to provide a heat transfer system of circulating liquid including a storage means and a vapor separator and means for discharging vapor therefrom into the storage means.

It is another object of the invention to provide in a heat transfer system means for continuously separating low-boiling components from liquids and accumulating them in the liquid state in another part of the system.

It is a further object of the invention to provide a process or a system in which the lower boiling components are separated and condensed, and to maintain the lower boiling components in contact with the liquid. To this extent it is an object of the invention to maintain a liquid in the system in chemical and physical balance.

The heat transfer system in accordance with the invention comprises in combination means for heating the liquid, means for separating low-boiling components from the liquid situated at the point of greatest dissociation which is directly beyond the heating means, means for condensing these low-boiling components, means for returning these components to said liquid just prior to its being heated, means for contacting the heated liquid with material to be heated, means for circulating the liquid, and means for storing the condensed low-boiling components before returning the same to circulating liquid.

The system may be operated vented to the atmosphere, in which case the pressures in the system are confined to the static head in the lines and the kinetic heads developed by the circulation. Preferably, however, the system may be operated so that there is a positive pressure exerted on the system in excess of atmospheric pressure, i. e., the system is operated under a superatmospheric pressure. In either case, the pressure on the system is sufficiently in excess of the partial pressure of low-boiling substances in the circulating liquid to cause a substantial amount of said substances to be retained in the liquid phase. When the partial pressure of low-boiling substances in the circulating liquid exceeds the pressure upon the liquid, whether operating at atmospheric pressure or under a positive pressure, such gases are permitted to escape from the liquid, although not from the system, and are collected, for example, in a storage tank wherefrom they may be returned to the system as desired, for example, when the operating temperature of the system is lowered or liquid is withdrawn from the system at another point.

The process of the invention, therefore, contemplates not only the step of removing low-boiling components from the heat transfer liquid in order to prevent their accumulation to a concentration at which vapor lock will occur, but also the step of maintaining the system under a positive pressure to retain in the liquid an amount of low-boiling components, liberatable in decomposition of the liquid in use, sufficient to inhibit decomposition thereof while permitting low-boiling components in excess of such amounts to escape, preferably accumulating them in another part of the system.

Another essential feature of the invention is the relative location of certain elements. The vapor separator is located in the circulating system immediately following the heat generator since the dissociation of the liquid is greatest at the point where the liquid is most highly heated. By removing the low-boiling components, which are in the form of a vapor, as soon as it is formed and at the point of highest temperature, the circulating system is free of interfering substances. The return connection, feeding condensed vapor to the circulating system, is located just prior to the heat generator in order to provide the liquid with the maximum amount of volatile components, thereby repressing further dissociation and enabling reassociation.

One embodiment of the heat transfer system in accordance with the invention is shown in the drawings in which:

Fig. 1 is a schematic illustration of the system.

Figs. 2 and 3 are cross-sections of the vapor separator showing the direction of flow.

Referring to Fig. 1, the flow of circulating liquid and of low-boiling components is controlled by the valves 1 to 7. The heat generator is indicated by the numeral 10, which may be a fire tube or liquid tube "boiler" fired by any fuel. Heated circulating liquid passes from the generator 10 through a line 11 into a vapor separator and storage tank 12 in which the low-boiling components in excess of those retained in the liquid by the pressure on the system are separated from the heated liquid. Heated liquid is withdrawn from the separator through lines 14 and a valve 1 in a line 15 into a load unit 16 where the heat of the liquid is transferred by indirect heat exchange to the material being heated. From the load unit the liquid is withdrawn through a line 18 and a pump 19 where it is recirculated through a venturi 20 in a line 22 to the heat generator.

Vapor released from the liquid in the vapor separator 12 passes by a line 30 into a condenser 32 where it is indirectly cooled by means of liquid circulating through cooling coils 33. From the condenser the condensate passes through a line 35 and may pass a pressure relief valve 6 in a line 37 into a collection and storage tank 38. The condensed low-boiling components in line 35 or from the collection tank 38 may be returned through lines 37 and 40 and valves 6 and 7 to the venturi 20 where it is admixed with the liquid in the circulating system. It is essential that the low-boiling components be introduced after the pump 19 in order to prevent vapor binding of many commonly used centrifugal pumps and prior to entry into the heat generator 10 such that the maximum concentration of volatiles will be present in the region of highest temperature. Flow controller valve 7 may be actuated by conditions of pressure and temperature as they exist elsewhere in the circulating heat transfer system.

The relief valve 6 serves a double purpose in that it both regulates the positive pressure upon the entire system and controls the flow of liquid into and out of the collection tank 38, preventing at the same time the introduction of air into the main circulating system which could result in undesirable oxidation of some of the usual heat transfer liquids. The driving force for moving the low-boiling components through the upper circuit comes from two sources. Firstly, from the pressure of the vapor collecting in top of the vapor separator exceeding the static pressure on the system and, secondly, from the pressure difference existing between the vapor separator and the inlet of the venturi 20. This pressure difference is created by the condensation in the condenser of the vapor from the vapor separator with its inherent decrease in volume and partial pressure and by the reduced pressure area created by the action of the venturi on the venturi side of the flow controller valve when this valve is opened. Although, of course, the venturi in the particular system just described will facilitate the movement of the light components and the admixing of the light components with the circulating liquid, the same movement and admixing may be accomplished by a mixing pump or similar device.

Permanent gases and moisture may be released from collection tank 38 by means of a pressure relief valve 5 and a drying tube 42 in a line 41. Condensed low-boiling components may also be returned to the heat transfer system by means of a valve 4 and a circulating means 44 in a line 45 which is connected to a supplementary storage tank 46. From the supplementary storage tank the condensed low-boiling components may be introduced into the circulating system by means of a valve 2 and a reversible pump 48 in line 49. Thus it may be desirable to introduce a quantity of the low-boiling components into the circulating heat transfer liquid, for instance, at the beginning of operation of the system to reduce the viscosity of the liquid and thereby increase the low temperature pumpability. The storage tank 46 may be emptied by means of a valve 3 in a line 50. Likewise the circulating system may be supplied or emptied by withdrawing the liquid through line 49 into the storage tank 46 and out through the line 50.

Two vapor separators in cross section, in accordance with this invention, are shown in Figs. 2 and 3 respectively. The vapor separator 12 is a stationary upright tank comprising a separating chamber 12 connected to inlet pipe 11 and outlet pipe 14. A pipe 30 connects the upper portion of chamber 12 with the condenser 32. The vapor separator may take various forms. It may simply be a closed tank with an inlet and outlet as shown in Fig. 2, wherein only slight agitation occurs. Alternatively the inlet and outlet may be arranged as shown in Fig. 3 so that the liquid passes through the tank in a whirling motion, thereby facilitating the separation of the vapor at the center, near the entrance to the pipe 30. Other means for gas separation, such as baffles, etc. may also be employed.

In general, the system functions as follows when utilizing a tetra-phenyl orthosilicate containing heat transfer medium:

Heat transfer liquid with low phenolic content from the pump 19 combines with a high phenolic content liquid mixture from the valve 7 at the venturi 20 and enters the heat generator 10. As the mixture leaves the heat generator 10 it enters the gas separator 12 where the major portion of the low-boiling component is separated off and driven to the condenser 32 where it is condensed and is ready to begin its cycle again.

In the normal course of operation decomposition of the heat transfer liquid takes place thereby liberating low-boiling substances. As the liquid passes through the vapor separator, gaseous low-boiling substances pass upwardly through the liquid and collect in the upper portion of the separator 12 until the pressure of these gases builds up and exceeds the static head of pressure in the pipe 30, whereby the vapor escapes upwardly into the condenser.

The portion of the liquid which is thus transferred to the condenser and subsequently to the storage tank is replaced by liquid therefrom. Thus, the liquid in the tank is in "equilibrium" with the liquid in the system, and the separator functions to replace the high boiling liquid initially in the tank by low-boiling components developed during use.

Gradually, during operation, as the heat transfer liquid decomposes, the concentration of liquid low-boiling substances in the storage tank increases. The liquid returning to the system in the pipe 40 will be a mixture of high and low-boiling components. In this way, the low boilers are in contact with the liquid in the system and are available for such reassociation reactions, or such repression of decomposition as occurs, depending on the nature of the liquid and the operating temperature.

In the case of tetra-aryl orthosilicates, it is desirable to have the phenols present in the liquid for the reasons explained. Its presence is objectionable when it causes a circulatory failure of the system. In the system of the invention, the liquid always has the maximum amount of phenol that can be tolerated under any conditions of operation. For example, if the conditions shift so that a larger amount of phenol can be present in the liquid, the phenol from the storage tank will return to the liquid through pipe 40 and flow control valve 7. Any surplus is retained in readiness for any reassociation with the liquid under conditions which are suitable. Thus the chemical composition of the liquid adjusts itself to the requirements of the system, and to this extent the system is in chemical as well as in physical balance.

When the storage tank contains only low boilers the system can no longer operate to remove low boilers because the liquid removed as a vapor is the same as that being returned as a liquid. In such event the liquid in the tank may be exchanged for a fresh portion of heat transfer liquid without interruption of the operation of the system. By this expedient the continuous operating time of the system may be prolonged until sludging or the increase of viscosity due to the presence of high polymers present difficulties.

When the system is closed down, the heat transfer liquid will, of course, cool and therefore contract to a considerable extent. As contraction thereof proceeds, condensed low-boiling substances will flow back into the circulating system proper. This will increase the concentration of low-boiling substances in the circulating liquid. If the liquid is one in which the low-boiling components reassocate chemically, this reassociation can take place readily. When the system is again started up, the low-boiling substances if present or if generated, will be returned to the storage tank in due course of operation.

The apparatus of the invention shown schematically in Fig. 1 may easily be adapted for use at superatmospheric pressure. Pressure is permitted to build up in the system and is kept constant by a pressure regulator-vacuum relief set up connected to the storage tank. In other respects the system is similar to that of Fig. 1, and its operation is similar.

As the system is started up under superatmospheric pressure and decomposition of the heat-transfer liquid begins, low-boiling decomposition products are accumulated therein until the sum of the partial pressures thereof equals the pressure exerted on the system. Thereafter gaseous decomposition products escape freely from the liquid through the gas separator, as when the system is operated at atmospheric pressure, i. e., essentially pressure equilibrium is maintained.

A novel system is hereby provided by which excess low-boiling components above those which can be contained in a circulating liquid are removed from the liquid but are maintained in contact therewith for immediate and automatic re-admixing with the liquid at any time the temperature or pressure varies such that the liquid can accommodate more of the lighter components which are of such nature that they will repress dissociation and can reassociate to form additional amounts of the liquid.

By the present system the excess of lighter components are present in the circulating liquid in the region of highest temperatures and are therefore most effective in repressing the undesirable decomposition of the liquid at points where dissociation is most likely. The low-boiling components are present throughout the system but not beyond the amount which may be safely contained in the body of the circulating liquid in the system. Thus the amount of volatiles which are contained in the heated liquid as it is withdrawn from the bottom of the gas separator will be substantially less than that which the liquid could contain, without forming a separate vapor phase, at subsequent points in the system before the heat generator, such as following the load unit and in the pump 19, where the liquid has been cooled considerably by the performance of its function in yielding up heat by transferring it to the material to be heated.

Various minor changes and modifications will occur to one skilled in the art upon reading the foregoing description and drawing, and various substitutions in the elements of the system may be made without departing from the inherent scope of the invention. Likewise various additional valves, gauges, pumps, etc. may be added but have been omitted for sake of clarity in illustrating and describing the system. The present invention contemplates and includes these modifications and additions.

I claim:

1. A heat transfer system for the circulation of heat transfer liquid in which the liquid is subject to decomposition with resulting formation of lighter compounds and for the separate control and circulation of said lighter compounds which comprises a pump, a heat generator, a venturi between said pump and said generator, a vapor separator and storage tank connected to the outlet of said generator, a load unit for heat transfer between said liquid and a load to be heated, a condenser connected to said separator for receiving vapor therefrom, a collection tank, a pressure relief valve and a flow controller valve, said condenser being connected to said collection tank through said pressure relief valve and being connected to said venturi and the system through said flow controller valve.

2. A heat transfer system for the circulation of heat transfer liquids containing low boiling components which comprises a heat generator; a vapor separator for withdrawing excess low boiling components connected to the outlet end of the generator; a load unit connected to the vapor separator to transfer heat from said liquid to material to be heated, the outlet of said load unit being connected to the inlet of the heat generator; means for recirculating said liquid through the heat generator, vapor separator and load unit; means for condensing and means for storing the vapor from said gas separator; means consisting essentially of a flow controller valve and a venturi connecting said condensing means with the system at a point just prior to the entry of the circulating liquid into said heat generator; and means consisting of a reversibly-acting pressure-vacuum relief valve connected between said condensing and storing means for maintaining superatmospheric pressure on said system.

References Cited in the file of this patent

UNITED STATES PATENTS

| Number | Name | Date |
|---|---|---|
| 352,908 | Barker | Nov. 23, 1886 |
| 2,290,347 | Moore et al. | July 21, 1942 |
| 2,360,665 | Fields | Oct. 17, 1944 |

FOREIGN PATENTS

| Number | Country | Date |
|---|---|---|
| 57,479 | Austria | Jan. 25, 1913 |
| 377,388 | France | Sept. 5, 1907 |